(12) United States Patent
Clark et al.

(10) Patent No.: US 9,171,091 B2
(45) Date of Patent: Oct. 27, 2015

(54) STORING A JOURNAL OF LOCAL AND REMOTE INTERACTIONS

(75) Inventors: Bryan William Clark, Westford, MA (US); Colin Walters, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 477 days.

(21) Appl. No.: 12/040,762

(22) Filed: Feb. 29, 2008

(65) Prior Publication Data
US 2009/0222463 A1     Sep. 3, 2009

(51) Int. Cl.
*G06F 7/00*        (2006.01)
*G06F 17/00*       (2006.01)
*G06F 17/30*       (2006.01)
*G06F 11/34*       (2006.01)

(52) U.S. Cl.
CPC ...... *G06F 17/30884* (2013.01); *G06F 11/3438* (2013.01); *G06F 11/3476* (2013.01); *G06F 17/30873* (2013.01); *G06F 17/30876* (2013.01)

(58) Field of Classification Search
CPC ................... G06F 17/30873; G06F 17/30876
See application file for complete search history.

(56) References Cited

U.S. PATENT DOCUMENTS

| | | | |
|---|---|---|---|
| 6,564,220 B1 * | 5/2003 | Huber et al. | 1/1 |
| 7,225,407 B2 * | 5/2007 | Sommerer et al. | 715/738 |
| 7,631,007 B2 * | 12/2009 | Morris | 709/224 |
| 2005/0240671 A1 * | 10/2005 | Beyer et al. | 709/227 |
| 2006/0064411 A1 * | 3/2006 | Gross et al. | 707/3 |
| 2007/0150496 A1 * | 6/2007 | Feinsmith | 707/100 |
| 2007/0160964 A1 * | 7/2007 | Albertsson | 434/219 |
| 2008/0134035 A1 * | 6/2008 | Pennington et al. | 715/713 |
| 2008/0134343 A1 * | 6/2008 | Pennington et al. | 726/28 |
| 2009/0222736 A1 | 9/2009 | Clark et al. | |
| 2011/0202400 A1 * | 8/2011 | Bedard et al. | |

* cited by examiner

*Primary Examiner* — Loan T Nguyen
(74) *Attorney, Agent, or Firm* — Lowenstein Sandler LLP

(57) ABSTRACT

An embodiment relates generally to a method of displaying information. The method includes monitoring any user activity within at least one application executing on a computer and detecting a completion of a user activity. The method also includes creating a link to the completed user activity and placing in the link in a time-ordered sequential basis in a journal section of a desktop of the computer.

22 Claims, 5 Drawing Sheets

STORING A JOURNAL OF LOCAL AND REMOTE INTERACTIONS

FIELD

This invention relates generally to visual desktops for computer systems, more particularly to systems and methods for a journal page for applications executing on computer systems.

DESCRIPTION OF THE RELATED ART

The use of the Internet has seen rapid growth over the last few years, fueled in significant part by availability and use of web browsing software that permits access, via a graphical user interface ("GUI") to network servers which are part of the World Wide Web ("Web"). These servers provide access to documents known as "web pages" or "web sites" using a Hypertext Transfer Protocol ("HTTP"). HTTP is an application protocol that provides user access to these web pages having various formats including text, graphics, images, sound, and dynamic features. Hypertext Markup Language ("HTML") is the standard page description language used with HTTP and provides basis document formatting. HTML allows a web page developer to specify these hypertext links to other servers and to other files.

A user using an HTML-compliant browser may specify a link via a Uniform Resource Locator ("URL"). When the user does so, the client browser makes a transmission control protocol/Interface protocol ("TCP/IP") request to the server associated with the link and consequently receives the corresponding web page formatted according to HTML. Note that XML can be a substitute for HTML.

The developers of prior art web browsers such as "MOSAIC", "NETSCAPE NAVIGATOR", and "MICROSOFT INTERNET EXPLORER" have focused their efforts on providing a rapid and efficient means for a user to access web pages having sophisticated graphical capabilities. Such web pages typically offer a wide variety of attention-generating features which include sound, animated graphics, banner advertisements, and continuously updated dynamic content, often tailored to a user's personal interests, side by side with lexically unordered hypertext links.

As websites proliferate and information grows increasing on-line, users have increasing wider variety of applications, data and websites to use. A user using a conventional browser can use the Web for information and tools. As a user browses the Web, she may locate interesting websites. However, a user may not immediately recall a particular website after one or two days. Accordingly, the user may have to recreate the search parameters to locate the particular website. Similarly, as a user works on files with applications (e.g., word processing, spreadsheet, etc.) on local files and remote files. Users may find it difficult to locate a recently used file after working on other files or after one or two days.

Accordingly, there is a need in the art for a mechanism for users to quickly locate recently websites and/or files without recreating the conditions for a search or browsing.

BRIEF DESCRIPTION OF THE DRAWINGS

Various features of the embodiments can be more fully appreciated, as the same become better understood with reference to the following detailed description of the embodiments when considered in connection with the accompanying figures, in which.

Figure 1:
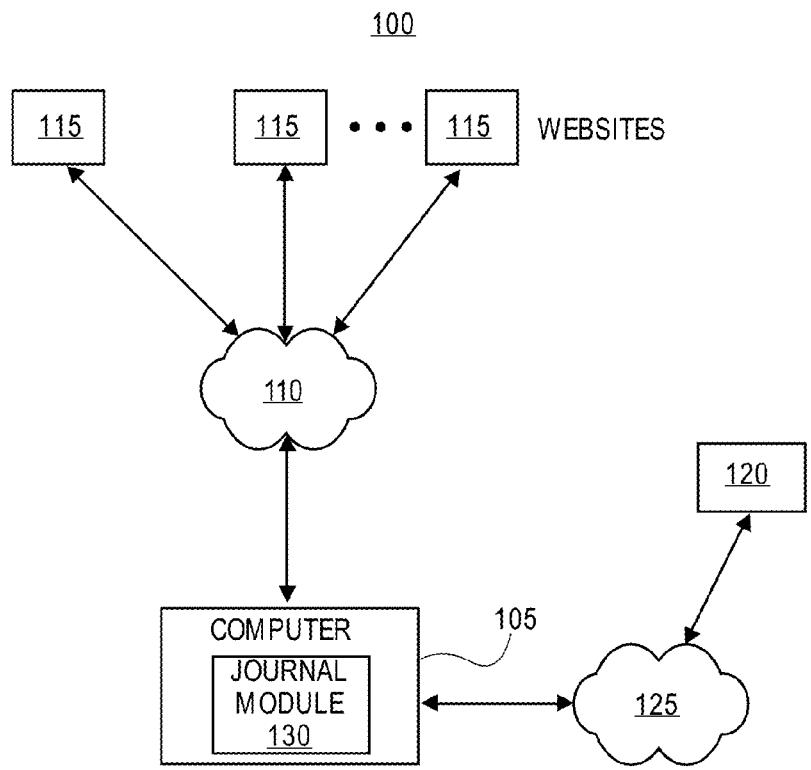
FIG. 1 depicts an exemplary system in accordance with various embodiments.

It will be appreciated that for simplicity and clarity of illustration, elements shown in the drawings have not necessarily been drawn to scale. For example, the dimensions of some of the elements are exaggerated relative to each other. Further, where considered appropriate, reference numbers have been repeated among the drawings to indicate corresponding elements and a repetitive explanation thereof will be omitted.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for a journal page. More particularly, a journal module can be configured to provide a journal listing of local activity of the user on a computer as well as the on-line activity of the user. For instance, the journal module can track which applications and files accessed locally and on-line as well as websites visited, i.e., integrating results into a single page. When the user completes an activity, the journal module can place a link to the completed activity in a journal section of the journal page. Accordingly, a user can maintain a listing of completed activities. The journal page can be implemented within a browser or as part of a desktop. In some embodiments, the journal page is saved and is retrieved when the user logs-back in.

A journal section for completed local and on-line activities can assist a user. For instance, a user can be working on a project which can involve several applications and associated files. A typical workflow in completing the project may involve a user working on file A associated with application X and then working on file B associated with application Y. The user may receive additional information to update file A while working on file B. Accordingly, the user can activate the link to file A in the journal section to bring up file A in application X to update the information.

Another example of the journal section assisting a user can be on-line browsing. More specifically, a user may visit a number of websites during a day. Instead of bookmarking a selected website, the user is free to browse the website knowing that the journaling module can capture the link to the website. A use can avoid cluttering the bookmark section of the browser and the time involved in maintaining bookmarks.

FIG. 1 illustrates an exemplary system 100 in accordance with various embodiments. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 can comprise a computer device 105, a a network 110 and web sites 115. The computer device 105 can be a desktop computer, laptop, client, or other similar computing platform as known to those skilled in the art. In some embodiments, the computer device 105 can be client of a server 120 and/or part of a local area network 125.

The computer device 105 can be coupled to the network 110. The network 110 can be a local area network, a wide area network or combinations thereof implementing network protocols such as TCP/IP, ATM, SONET, or other known network protocols The network 110 can also be part of a network that provides Internet access for users. The network 110 can be configured to provide a communication conduit for data, services, and applications to be exchanged between the computer device 105 and websites 115. The computer device 105 can be coupled to the network 110 through a network interface (not shown). The network interface can comply with the protocol being used within the network 110.

Similarly, in some embodiments, the computer device 105 can couple with local network 125 through the network interface to communicate with server 120. The local network 125 can be a local area network implementing a local area network protocol such as Ethernet, X.25 or other similar protocols known to those skilled in the art. The server 120 can be implemented with servers from various manufacturers such as Dell, Sun Microsystems, Fujitsu, Transmeta, AMD or other similar OEM providers.

The websites 115 can be any website located on the Web. Websites 115 can be portals, on-line stores, manufacturer websites, or any other type of websites. The websites 120 can be accessed by executing a browser to locate the websites 115 using the respective URLs of the website 115 or a search engine.

In some embodiments, the computer device 105 can store and execute a journal module 130 as part of an application such as browser or a desktop. The journal module 130 can be instantiated during the activation of the application by a user. The journal module 130 can be configured to interface with the underlying operating system and GUM API of the underlying application.

The journal module 130 can be configured to provide a journal listing of local activity and on-line activity of the user on the computer device 105. For instance, the journal module 130 can monitor which applications and files are accessed locally and on-line as well as websites visited. When the user completes an activity, the journal module 130 can place a link to the completed activity in a journal section of an application such as a browser or desktop executing on the computer device 105. Unlike conventional browsers that default to local history search (e.g., URL address bar) or a remote search (e.g., Firefox start page), the journal page integrates the results from both into a single page. By the end of the session, a user can have a listing of the activities. In some embodiments, the journal section is saved and is retrieved when the user logs-back in.

Figure 2:
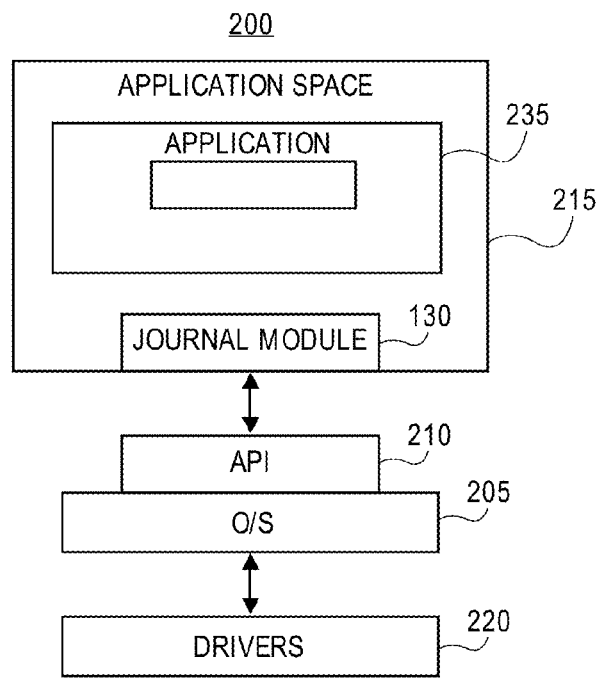
FIG. 2 illustrates an exemplary software environment in accordance with various embodiments.

FIG. 2 illustrates an exemplary software environment 200 in accordance with various embodiments. It should be readily apparent to those of ordinary skill in the art that software environment 200 depicted in FIG. 2 represents a generalized schematic illustration and that other components may be added or existing components may be removed or modified.

As shown in FIG. 2, software environment 200 can include an operating system 205. Operating system 205 can be a version of a Linux™, UNIX™, Windows™, or similar multi-tasking, multi-user operating system. A run-time environment (not shown) can be configured to execute on operating system 205. The run-time environment can provide a set of software that supports the execution of applications/programs. The run-time environment can also comprise an application program interface ("API") 210 and a complementary API (not shown) within an application space 215. API 210 can be configured to provide a set of routines that application space 215 uses to request lower-level services performed by operating system 205. Operating system 205 can include a kernel (not shown) and device drivers 220. The kernel can be configured to provide secure access to the underlying hardware of a processor through the device drivers 220.

Application space 215 can represent the space where a user can execute applications given the allotted memory space as determined by a system administrator of software environment 200. Within application space 215, a user can open and execute a number of applications such as an application 235, where the application 235 can be a browser or a desktop application. The application 235 can provide a single graphical user interface ("GUI") to organize, search, and utilize applications and/or data. For example, the application 235 can include a variety of menus that allow a user to manipulate applications and/or data, to control peripherals such as scanner or printer, etc.

Within the application space 215, the journal module 130 can be executing and monitoring the activity of a user. As previously described and in further detail below, the journal module 130 monitors which applications and files are accessed locally and on-line as well as websites visited. When the user completes an activity, the journal module 130 can place a link, i.e., a journal link, to the completed activity in a journal section of the application 235 executing on the computer device 105. The journal link can include an icon to the completed application (or website) and a URL to the location of the closed file (or website).

Figure 3:
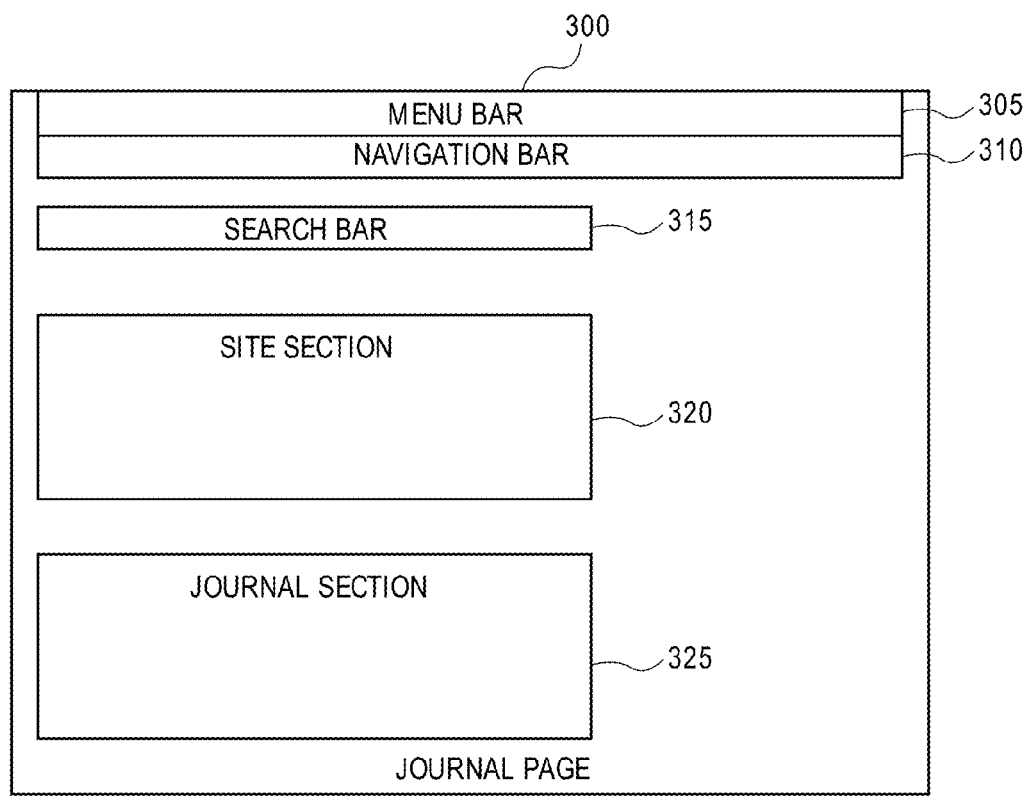
FIG. 3 depicts an exemplary journal page in accordance with various embodiments.

FIG. 3 depicts an exemplary journal page 300 for the application 235 in accordance with various embodiments. It should be readily apparent to those of ordinary skill in the art that the journal page 300 depicted in FIG. 3 represents a generalized schematic illustration and that other components may be added or existing components may be removed or modified.

As shown in FIG. 3, the journal page 300 can comprise a menu bar 305, a navigation bar 310, a search bar 315, a top site section 320 and a journal section 325. The journal page 300 can be implemented with a markup language such as SGML, HTML, XML or other similar languages. The journal page 300 can also be created using GUI interface toolkits or visual programming languages.

The menu bar 305 can be configured to provide menu options for the user such as file operations, print functions, option settings, viewing options, and help option. The menu bar 305 can be user-configurable which allows the user to add or delete menu options.

The navigation bar 310 can be configured to permit a user to enter URLs to direct the journal page 300 to a website. The search bar 315 can be configured to allow a user to enter terms for a search at a designated search engine.

The top site section 320 can be configured to display a list of the most popular websites visited by the user. The list of websites, i.e., URLs, can be based on a variety of factors such as time visited, frequency of visits, etc.

The journal section 325 can be configured to display a list of recent activity of the user. Activities can include applications used, files accessed (local and remote), websites visited, and other computer related activities. For each activity completed, the journal section 325 shows a respective journal link with an icon representing the application and URL to the accessed file and/or website along with a time stamp.

Figure 4:
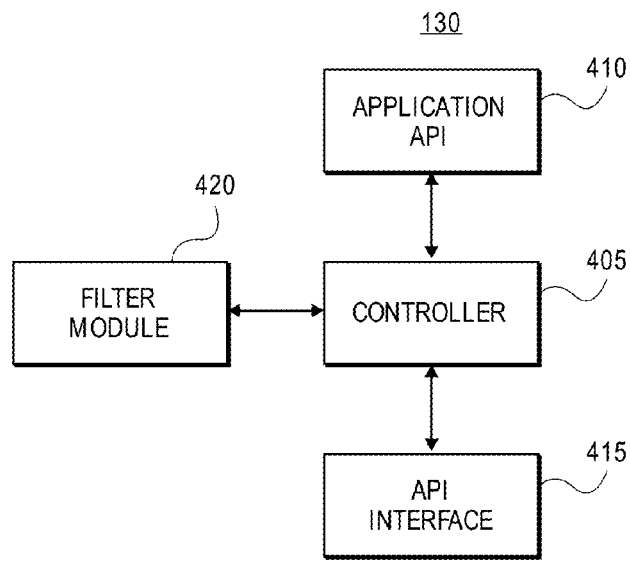
FIG. 4 illustrates an exemplary detailed block diagram of a journaling module in accordance with various embodiments.

FIG. 4 illustrates an exemplary block diagram of the journal module 130 in accordance with various embodiments. It should be readily apparent to those of ordinary skill in the art that the journal module 130 depicted in FIG. 4 represents a generalized schematic illustration and that other components may be added or existing components may be removed or modified.

As shown in FIG. 4, the journal module 130 can comprise a controller module 405, an application API 410, a API 415, and a filter module 420. The journal module 130 can be implemented using software components, hardware components or combinations thereof. In software embodiments, the journal module 130 can be implemented using computer languages such as C, C++, object oriented programming languages or other programming languages. In hardware embodiments, the journal module 130 can be implemented using a processor, microcontroller, an application specific integrated circuit, EEPROM or other programmable devices.

The controller module 405 can provide the functionality of the journal module 130 as previously described and described herein below. The controller module 405 can manage the interactions between the application API 410 and the API 415. For instance the controller module 405 can receive data from the operating system 205 related to the initiation and cessation of activity on the computer device 105 through the API 415. The controller module 405 can send information to the application 235 such as link information and how to render the journal page 300 through the application API 410.

The application API 410 can be coupled to the controller module 405. The application API 410 can be an interface to the application 235. The controller module 405 can forward data related to completed activities to render on the journal page 300. The controller module 405 can also render information related to the data to the hot site section 320.

The controller module 405 can be further coupled to the filter module 420. The filter module 420 can be configured to apply a filter to the web pages to determine whether the web pages are to be saved to the journal section 325. The filter can be instantiated by heuristic algorithms, which are detailed in co-pending U.S. patent application Ser. No. 12/040,749, filed Feb. 29, 2008, entitled "Systems and Methods For Filter Module For a Browser History", commonly assigned and with common inventorship, which is incorporated by reference in its entirety.

The controller module 405 can also be coupled to the API 415. The API 415 can be configured to interface with the operating system 205. The controller module 405 can monitor the initiation and termination of applications through the API 415.

Figure 5A:
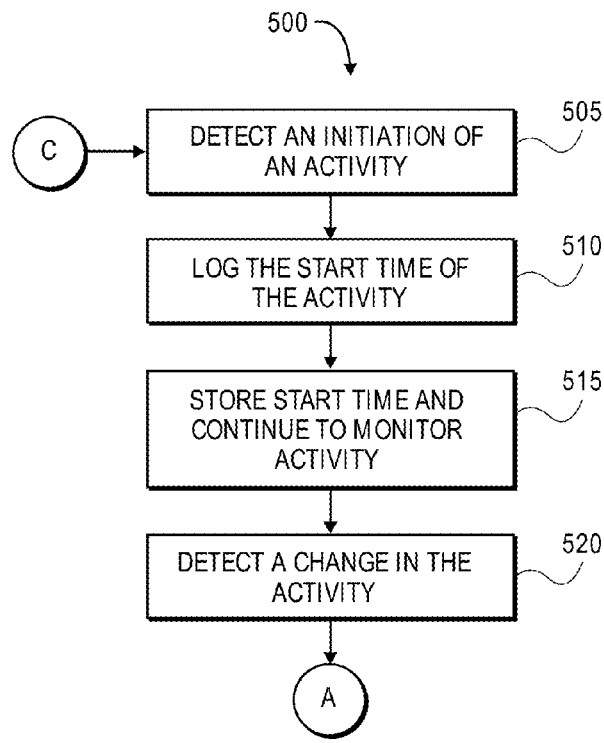
FIGS. 5A-B, collectively, depict an exemplary flow diagram in accordance with various embodiments.
Figure 5B:
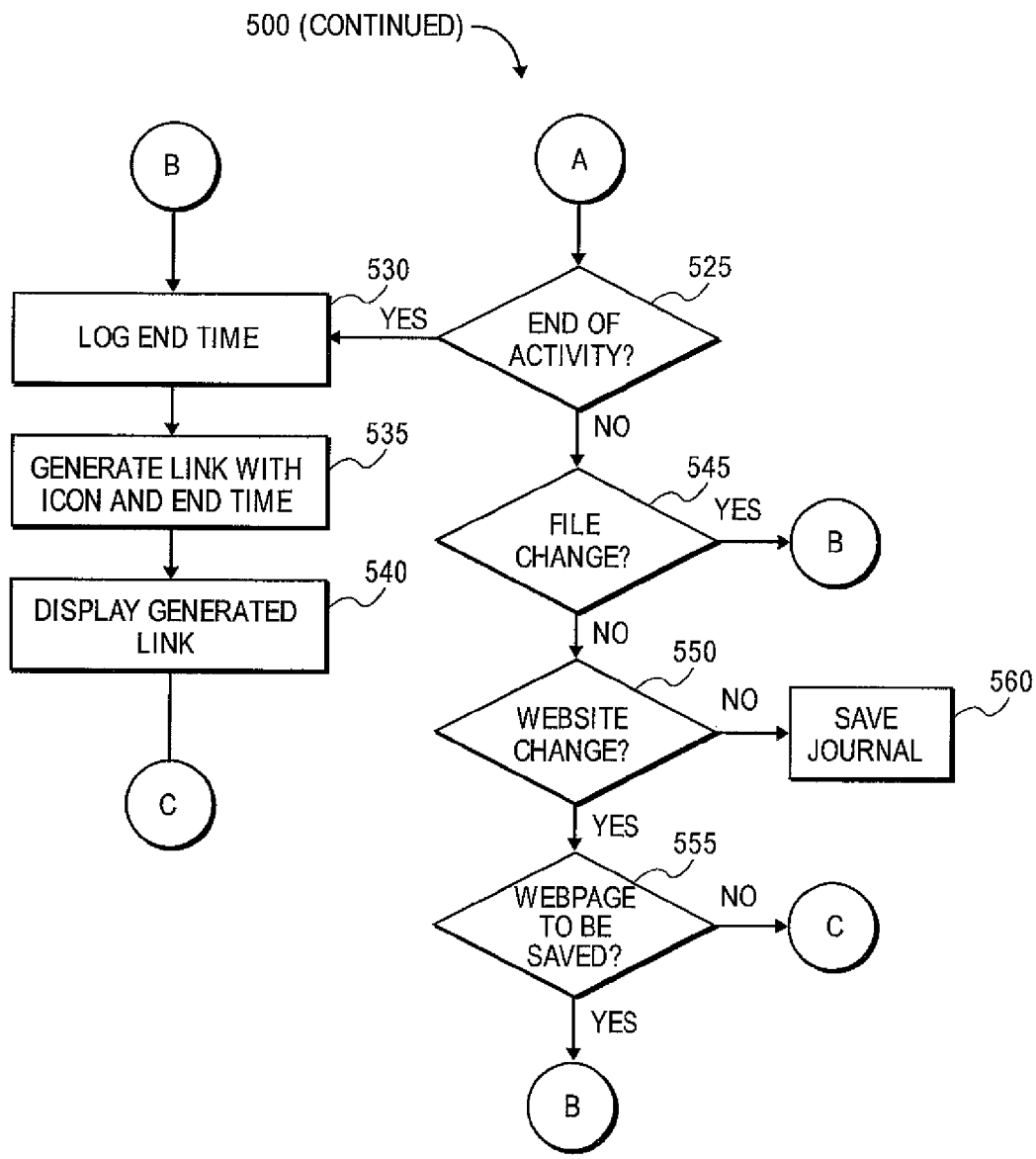

FIGS. 5A-B collectively illustrate an exemplary flow diagram 500 executed by the controller module 405 in accordance with various embodiments. It should be readily apparent to those of ordinary skill in the art that the flow diagram depicted in FIGS. 5A-B represent a generalized schematic illustration and that other steps may be added or existing steps may be removed or modified.

As shown in FIG. 5A, the controller module 405 can be configured to detect the initiation of an activity, in step 505. The controller module 405 can also log the activity into a data structure. For example, if a user initiates a word processing application, the controller module 405 can monitor the operating system 205 for when the user initiates an application or other activity. The controller module 405 can then enter the activity into the data structure.

In step 510, the controller module 405 can then log the initiation time into the data structure and, at step 515, continue to monitor the activities within the data structure.

In step 520, the controller module 405 can detect a change in any of the monitored activities. Referring to FIG. 5B, the controller module 405 can determine whether the event is an end of activity, in step 525. If the event is an end of activity, the controller module can log the end time in the data structure, in step 530. The controller module 405 can then generate a journal link to the file or website/web page that was just completed, in step 535. The journal link can contain an icon that is associated with the application as well as URL for the location of the file or website/web page. Subsequently, the controller module 405 can send the generated journal link to the journal section 325 of the journal page 300, in step 540. The controller module 405 can then return to the processing of step 505.

Otherwise, returning to step 525, if the event is not an end of activity, the controller module 405 can determine whether the event is a file change, in step 545. If the event is a file change, the controller module 405 can be configured to proceed to the processing associated with step 530. Otherwise, the controller module 405 can be configured to determine whether the event was a website or web page change, in step 550. If the event If the event was a website or web page change, the controller module 405 can determine whether visited web page should be saved to the journal section 325 by applying the filter module 420 to the visited web page, in step 555.

If the website page should be saved, the controller module 405 can proceed to the processing associated with step 530. Otherwise, the controller module 405 can proceed with the processing of step 505 (see FIG. 5A). Returning to step 550, if the event is not a website change, the controller module 405 can be configured to save the current state of the journal page 300 to be loaded up during the next session, in step 560. Subsequently, the controller module 405 can be configured to shut down.

Figure 6:
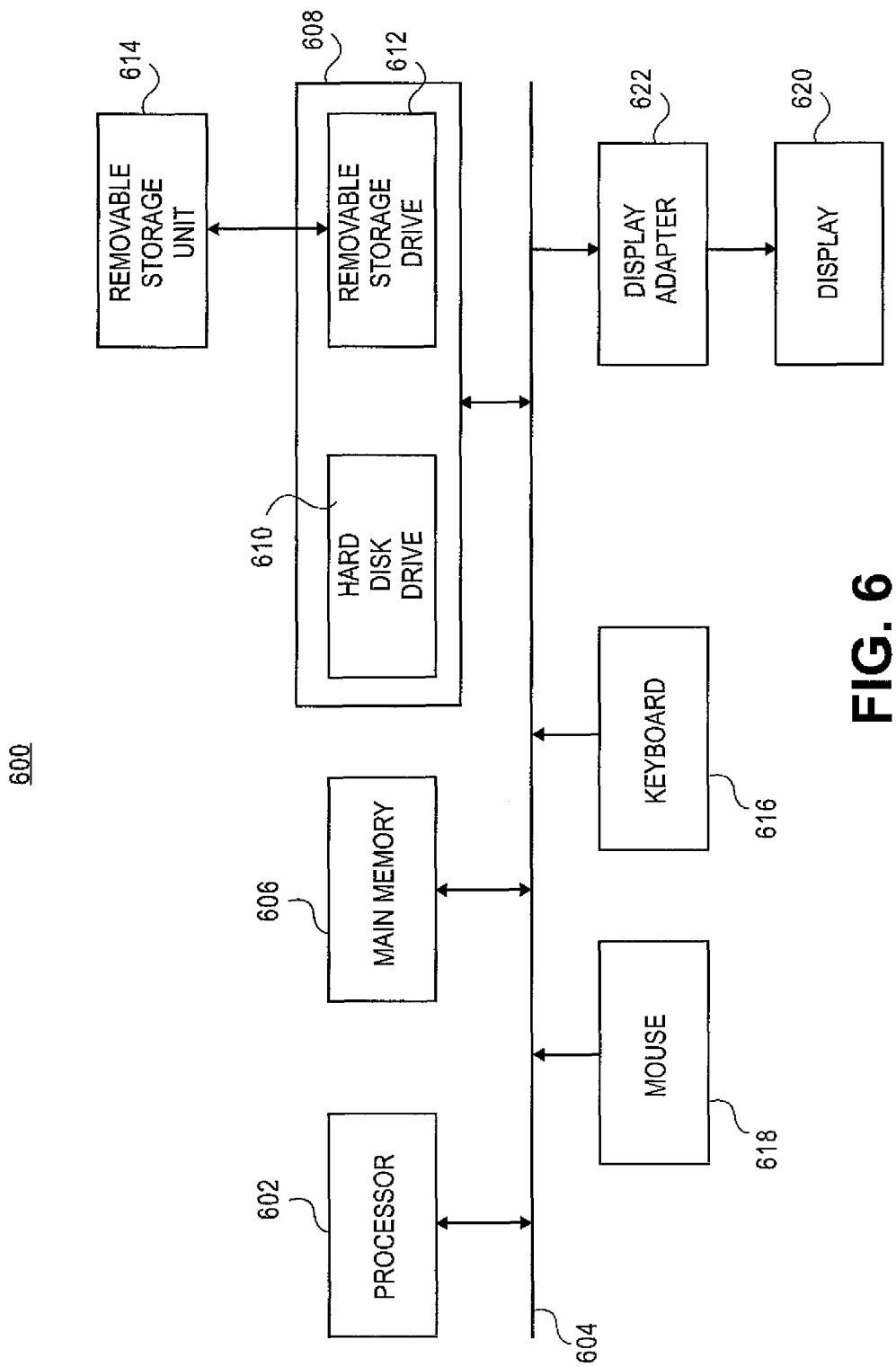
FIG. 6 illustrates an exemplary computing platform in accordance with various embodiment.

FIG. 6 depicts an exemplary block diagram of a computer device 105 where an embodiment may be practiced. The functions of the journaling module 130 may be implemented in program code and executed by the computer device 105. The journaling module 130 may be implemented in computer languages such as PASCAL, C, C++, JAVA, etc.

As shown in FIG. 6, the computer device 105 includes one or more processors, such as processor 602 that provide an execution platform for embodiments of the journaling module 130. Commands and data from the processor 602 are communicated over a communication bus 604. The computer device 105 also includes a main memory 606, such as a Random Access Memory (RAM), where the journaling module 130 may be executed during runtime, and a secondary memory 608. The secondary memory 608 includes, for example, a hard disk drive 610 and/or a removable storage drive 612, representing a floppy diskette drive, a magnetic tape drive, a compact disk drive, flash drive, etc., where a copy of a computer program embodiment for the journaling module 130 may be stored. The removable storage drive 612 reads from and/or writes to a removable storage unit 614 in a well-known manner. A user interfaces with the journaling module 130 with a keyboard 616, a mouse 618, and a display 620. The display adapter 622 interfaces with the communication bus 604 and the display 620. The display adapter 622 also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
 receiving, from an operating system, first information reflecting a local interaction with a local resource occurring in conjunction with a first application, the local resource being stored in a local memory and second information reflecting a remote interaction with a remote resource occurring in conjunction with a second application, the remote resource being associated with the local resource and stored in a remote memory;
 creating, by a processor and in view of the first information, the second information, a determination of a completion of a first activity with respect to the local resource, and a determination of a completion of a second activity with respect to the remote resource, a record, the record identifying the local resource, the remote resource, the first application, and the second application;
 storing the record in a journal section of the local memory;
 generating, by the processor, a journal page in view of the record in the journal section of the local memory, the journal page comprising a link to the local resource and a link to the remote resource; and
 generating a display of the journal page via a graphical user interface.

2. The method of claim 1, further comprising:
 logging an end time denoting a completion of the local interaction with the local resource; and
 including the end time in the journal section in association with the record.

3. The method of claim 1, further comprising:
 associating a graphical icon with the local interaction with the local resource; and
 including the graphical icon in the journal page in association with the record.

4. The method of claim 1, further comprising:
 detecting an end of a session; and
 storing information contained in the journal section in persistent storage in response to detecting the end of the session.

5. The method of claim 4, further comprising:
 detecting a start of a session; and
 retrieving the information from the persistent storage in response to detecting the start of a session.

6. The method of claim 1, further comprising:
 collecting information reflecting on-line user activity of the user through a browser; and
 sorting websites garnered from the information reflecting the on-line user activity in view of a predetermined criteria, wherein the journal section includes an ordered list of the websites associated with the on-line user activity.

7. The method of claim 1, wherein the local resource comprises a file stored in the local memory.

8. The method of claim 1, wherein the local resource comprises a software application stored in the local memory.

9. The method of claim 1, further comprising:
 receiving an indication that a user has clicked on a link to the local resource of the displayed journal page; and
 opening the local resource via the first application in response to the indication.

10. A system comprising:
 a local memory to contain instructions; and
 a processor, operatively coupled to the memory, that executes the instructions to:
 run an operating system to provide an application space for the execution of applications and the use of data; and
 run a module within the application space, wherein the module is to:
 receive, from the operating system, first information that reflects a local interaction with a local resource that occurs in conjunction with a first application, the local resource being stored in the local memory and second information reflecting a remote interaction with a remote resource that occurs in conjunction with a second application, the remote resource being associated with the local resource and stored in a remote memory;
 create, in view of the first information, the second information, a determination of a completion of a first activity with respect to the local resource, and a determination of a completion of a second activity with respect to the remote resource, a record, the record identifying the local resource, the remote resource, the first application, and the second application;

store the record in a journal section of the local memory;

generate a journal page in view of the record in the journal section of the local memory, the journal page comprising a link to the local resource and a link to the remote resource; and generate a display of the journal page via a graphical user interface.

11. The system of claim 10, wherein the module is further to log an end time denoting completion of the local interaction with the local resource and include the end time in the journal section in association with the record.

12. The system of claim 10, wherein the module is further to associate a graphical icon with the local interaction with the local resource and include the graphical icon in the journal page in association with the record.

13. The system of claim 10, wherein the module is further to detect an end of a session and store information contained in the journal in persistent storage in view of detecting the end of the session.

14. The system of claim 13, wherein the module is further to detect a start of a session for the system and retrieve the information from the persistent storage in view of detecting the start of the session.

15. The system of claim 10, wherein the module is further to collect information reflecting on-line user activity of the user through a browser and sort websites garnered from the information reflecting the on-line user activity in view of a predetermined criteria, wherein the journal section includes an ordered list of the websites associated with the on-line user activity.

16. The system of claim 10, wherein the local resource comprises a file stored in the local memory.

17. The system of claim 10, wherein the local resource comprises a software application stored in the local memory.

18. The system of claim 10, wherein the module is further to receive an indication that a user has clicked on a link to the local resource of the displayed journal page and open the local resource via the first application in response to the indication.

19. A non-transitory computer-readable medium having instructions encoded thereon which when executed by a processor cause the processor to perform operations comprising:

receiving, from an operating system, first information reflecting a local interaction with a local resource occurring in conjunction with a first application, the local resource being stored in a local memory and second information reflecting a remote interaction with a remote resource occurring in conjunction with a second application, the remote resource being associated with the local resource and stored in a remote memory;

creating, by the processor and in view of the first information, the second information, a determination of a completion of a first activity with respect to the local resource, and a determination of a completion of a second activity with respect to the remote resource, a record, the record identifying the local resource, the remote resource, the first application, and the second application;

storing the record in a journal section of the local memory;

generating, by the processor, a journal page in view of the record in the journal section of the local memory, the journal page comprising a link to the local resource and a link to the remote resource; and generating a display of the journal page via a graphical user interface.

20. The non-transitory computer-readable medium of claim 19, wherein the operations further comprise:

detecting an end of a session; and storing information contained in the journal section in persistent storage in view of detecting the end of the session.

21. The non-transitory computer-readable medium of claim 20, wherein the operations further comprise:

detecting a start of a session; and retrieving the information from the persistent storage in view of detecting the start of the session.

22. The non-transitory computer-readable medium of claim 19, wherein the operations further comprise receiving an indication that a user has clicked on a link to the local resource of the displayed journal page and opening the local resource via the first application in response to the indication.

* * * * *